United States Patent [19]

St-Jean et al.

[11] Patent Number: 4,827,370

[45] Date of Patent: May 2, 1989

[54] ENCLOSURE FOR ELECTRIC DEVICE, IN PARTICULAR FOR SURGE ARRESTER, INCLUDING A MOLDED, ELECTRICALLY INSULATING ENVELOPE

[75] Inventors: Guy St-Jean, Longueuil; André Hamel; Michel Bourdages, both of Boucherville; Daniel Dumont, Laval, all of Canada

[73] Assignee: Hydro-Quebec, Montreal, Canada

[21] Appl. No.: 136,828

[22] Filed: Dec. 22, 1987

[30] Foreign Application Priority Data

Dec. 23, 1986 [CA] Canada .................................. 526139

[51] Int. Cl.⁴ ................................................ H02H 9/04

[52] U.S. Cl. .................................... 361/127; 361/117; 361/118; 313/231.11; 313/244

[58] Field of Search ....................... 313/231.11, 231.21, 313/622, 623, 624, 244; 361/117, 120, 121, 122, 123, 124, 125, 126, 127, 128, 129, 130

[56] References Cited

U.S. PATENT DOCUMENTS

| | | | |
|---|---|---|---|
| 3,702,419 | 11/1972 | Carothers et al. | 361/128 X |
| 4,404,614 | 10/1985 | Koch et al. | 361/128 |
| 4,547,831 | 10/1985 | Hellman | 361/127 |
| 4,587,592 | 5/1986 | Nakano et al. | 361/127 |
| 4,729,053 | 3/1988 | Maier et al. | 361/118 |

*Primary Examiner*—A. D. Pellinen
*Assistant Examiner*—H. L. Williams
*Attorney, Agent, or Firm*—Foley & Lardner, Schwartz, Jeffery, Schwaab, Mack, Blumenthal & Evans

[57] ABSTRACT

An enclosure for electric device, in particular for surge arrester, comprises an outer, cylindrical envelope and an inner wall both made of electrically non conducting materials. One of the ends of the envelope is closed while the other is open. An electrode with a principal portion inside the enclosure extends through the envelope and projects outside the latter. Bolt anchors are used for fixing the enclosure on a mechanical support and for mounting a closure device on the open end of the envelope. The material constituting the inner wall is impervious to humidity and protects the envelope against breaking thereof by thermal shock caused for example by the production of an electric arc within the enclosure, while the material constituting the cylindrical envelope is a synthetic insulating material capable of withstanding a high mechanical tension. The envelope is molded on the inner wall and around the electrode and the bolt anchors, whereby the inner wall and the electrode are integrated to the envelope, and the bolt anchors are fixedly attached to the synthetic insulating material.

36 Claims, 3 Drawing Sheets

ENCLOSURE FOR ELECTRIC DEVICE, IN PARTICULAR FOR SURGE ARRESTER, INCLUDING A MOLDED, ELECTRICALLY INSULATING ENVELOPE

BACKGROUND OF THE INVENTION

1. Field of the Invention

The present invention relates to an enclosure for electric device, of the type comprising an outer envelope made of molded, electrically insulating material. The present invention relates more specifically but not exclusively to a cylindrical enclosure of this type, for use in a surge arrester.

In the present description and in the appended claims, the expressions such as "insulating" and "insulation" are related to electric insulation between electrically conducting pieces under voltage or grounded.

2. Brief Description of the Prior Art

A surge arrester is an electric device which is connected in parallel with another electric apparatus, in order to protect the latter apparatus against overvoltages produced between the terminals thereof. The insulation level of the electric apparatus and consequently the manufacturing costs thereof can therefore be reduced when a surge arrester is used in combination with such an electric apparatus. More specifically, a surge arrester is normally an open circuit which becomes a closed circuit parallel to the electric apparatus to be protected when a significant overvoltage appears between the terminals of the apparatus.

The surge arresters presently available on the market, which are utilized in networks for the transmission or distribution of electric energy, comprise in most of the cases an envelope of porcelain having the general aspect of a cylindrical tube sometimes closed at one end, and a pile of disk-like varistors mounted within the envelope of porcelain. As it is well known, varistors are electrically active elements made of metal oxide or of silicium carbide, and whose impedance varies non linearly when subjected to an overvoltage so as to provide for adequate overvoltage protection. Upon occurrence of a fault in a surge arrester, the varistors are permanently short-circuited whereby an electric arc is produced inside the envelope, which electric arc generates high, explosive pressures as well as temperatures overstepping the melting point of all the known metals. In the prior art, pressure limiting mechanisms have been designed to protect the envelopes of the surge arresters against explosion caused by an internal short-circuit. These pressure limiting mechanisms transfer the electric arc from the inside to the outside of the envelope by means of diaphragms and by means of nozzles orienting the hot gases, so as to eliminate the high, internal pressures.

However, such pressure limiting mechanisms are expensive, due to the necessity of mounting the same on an envelope of porcelain. Indeed, the envelopes of porcelain exclusively used up to now in the construction of surge arresters cannot tolerate, at moderate costs, the mechanical tensions required by such pressure limiting mechanisms. For that reason, these mechanisms are mostly provided in surge arresters installed in high voltage stations of networks used in the transmission of electric energy, the unitary price of such surge arresters being presently ten times higher than that of the surge arresters installed in networks for the distribution of electric energy, operating at voltages lower than 35 kV, and provided with no pressure limiting mechanism.

Accordingly, the surge arresters presently installed in networks distributing electric energy being provided with no pressure limiting mechanism, they are susceptible of explosion upon occurrence of an internal, high pressure. However, their cost remains lower than that which would result from the increase in insulation level of the electric apparatus to be protected. If such surge arresters are rendered non explosive by providing them with pressure limiting mechanisms, their cost, as mentioned hereinabove, is multiplied by ten, and consequently installation of conventional, non-explosive surge arresters in networks used in the distribution of electric energy is not economically advantageous.

Another drawback of the existing surge arresters installed in distribution networks is that, in most of the cases, they are mechanically supported through a metallic band encircling their envelope of porcelain nearby the center thereof, which metallic band being attached to a mechanical support structure often electrically grounded. This type of support requires an exaggerated extension of the envelope of porcelain in the axial direction so as to increase the distance between each of the two electric ends of the surge arrester and the metallic support band whereby adequate insulation between the metallic support band and each of the two electric ends of the surge arrester is obtained. Of course, this type of construction contributes in increasing the cost of the surge arresters.

A further drawback of the conventional surge arresters used in networks distributing electric energy is their lack of humidity tightness. Of course, the anchors adapted to the porcelain and capable of withstanding high mechanical tensions, which are used in the non explosive surge arresters of the high voltage stations, are prevented from being used to increase the pressure applied on the gaskets, because of their prohibitive cost.

Recently, numerous synthetic insulating materials formed with aggregates and binders including epoxy, polymers or other substances, have produced dielectric characteristics comparable to those of porcelain. Moreover, these synthetic materials have two incontestable advantages over the porcelain, namely its capacity to withstand very high mechanical tensions close to the tensions concrete can withstand, as well as the possibility of molding it on pieces of metal or of other materials.

OBJECT OF THE INVENTION

The principal object of the present invention is therefore to replace the porcelain, in particular but not exclusively by a synthetic insulating material of the above described type in the manufacture of a molded, electrically insulating envelope for surge arrester, and more generally in the manufacture of a molded, insulating envelope for electric device, whereby the above discussed drawbacks inherent to the porcelain are eliminated.

SUMMARY OF THE INVENTION

More specifically, according to the present invention, there is provided an enclosure for electric device, comprising:

an outer envelope;

an inner wall made of an electrically non conducting material impervious to humidity and protecting the outer envelope against breaking thereof by thermal shock caused by heat produced within the enclosure; and anchor means for fixing the enclosure on a mechanical support.

The outer envelope is made of an insulating material capable of withstanding a high mechanical tension, and is molded on the inner wall and around the anchors means, whereby the inner wall is integrated to the envelope and the anchor means are fixedly attached to the insulating material constituting the outer envelope.

The invention also relates to a cylindrical enclosure for surge arrester, comprising:

an outer, cylindrical envelope having a first, closed end and a second, open end;

an inner wall made of an electrically non-conducting material impervious to humidity and protecting the cylindrical envelope against breaking thereof by thermal shock caused by the production of an electric arc within the enclosure;

an electrode located at the closed end of the cylindrical envelope and comprising a principal portion inside the enclosure, and an extension attached to the inside, principal portion of the electrode, traversing the outer envelope and projecting outside the enclosure;

first anchor means mounted on the closed end of the outer envelope for fixing the enclosure to a mechanical support; and second anchor means mounted on the open end of the cylindrical envelope for fixing a closure device of the enclosure.

Again, the outer envelope is made of an insulating material capable of withstanding a high mechanical tension. This cylindrical envelope is also molded on the inner wall and around the electrode and the first and second anchor means, whereby the inner wall and the electrode are integrated to the cylindrical envelope, an the first and second anchor means are fixedly attached to the insulating material constituting the outer envelope.

Preferably, the insulating material constituting the envelope of the enclosure according to the invention is, as already mentioned hereinabove, a synthetic insulating material such as epoxy-concrete, and polymeric concrete. In epoxy-concrete, sand is used as aggregate and epoxy is the binder, while in polymeric concrete, the aggregate may be, in particular, sand, and the binder is a synthetic resin, that is a resin produced by synthesis.

As the material, such as a synthetic insulating material of the above described type, constituting the envelope eliminates all the drawbacks inherent to porcelain, non explosive surge arresters proof against envelope breaks and to be installed in networks used in the distribution of electric energy can be constructed at a cost comparable with that of the conventional surge arresters of distribution networks which are susceptible of explosion.

Of course, any other material having properties similar to that of the synthetic insulating materials such as epoxy-concrete and polymeric concrete can be used in the manufacture of the envelope, and that without departing from the scope of the present invention.

The objects, advantages and other features of the present invention will become more apparent upon reading of the following non-restrictive, detailed description of a preferred embodiment thereof, suitable for use in a surge arrester and given as a non-limitative example only with reference to the accompanying drawings.

DETAILED DESCRIPTION OF THE PREFERRED EMBODIMENT

Figure 1:
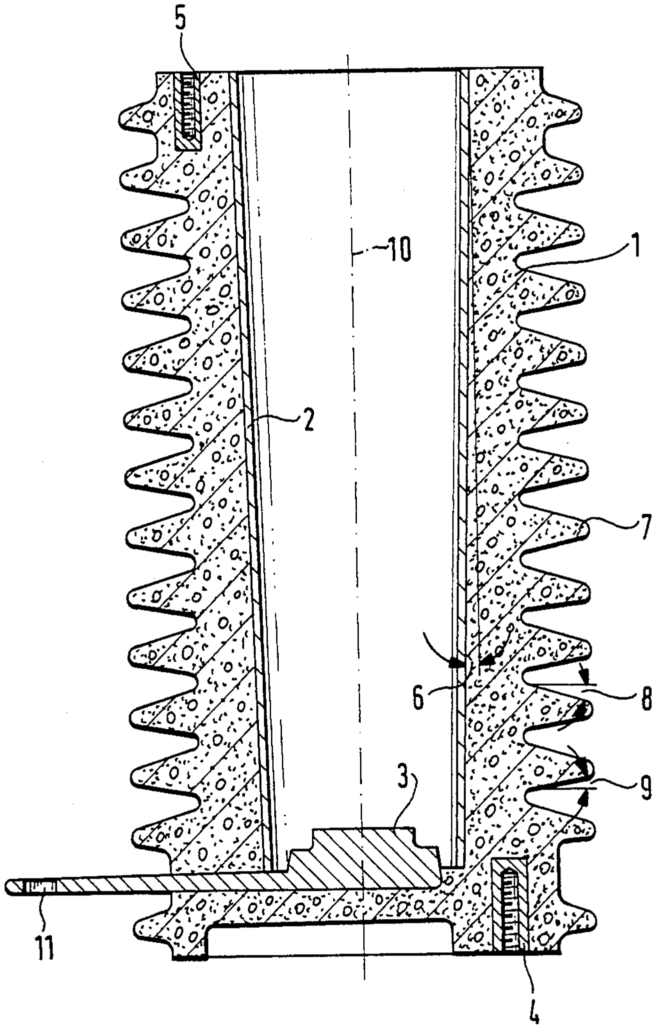
FIG. 1 is a vertical, cross-sectional view of a cylindrical enclosure for surge arrester according to the present invention.

As illustrated in FIG. 1 of the drawings, the enclosure for surge arrester according to the invention comprises an outer, nsulating envelope 1 having the general aspect of a vertical, cylindrical tube. The envelope 1 comprises a lower, closed end and an upper, open end. As indicated in the foregoing description, the envelope 1 is made of an insulating material, in particular a synthetic insulating material such as epoxy-concrete and polymeric concrete. It is molded on an inner wall 2, around an electrode 3, and around bolt anchors 4 and 5. Consequently, the inner wall 2 and the electrode 3 are integrated to the envelope 1, while the anchors 4 and 5 are fixedly attached to the insulating material constituting the envelope 1, as this material is capable of withstanding a high mechanical tension.

The inner surface of the envelope 1 and accordingly the inner wall 2 are frusto-conical. The inner surface of the envelope 1 therefore defines an angle 6 suitable to facilitate withdrawal of the inner mold after molding of the envelope 1 is completed. The angle 6 also facilitates expansion of the gases produced by an electric arc generated within the enclosure of FIG. 1 towards an upper, pressure limiting mechanism, which mechanism will be described in detail hereinafter.

The external profile of the envelope 1 is formed with a plurality of annular flanges such as 7. As surge arresters are mounted outdoors, the well known function of the flanges 7 is to ensure dielectric insulation by the envelope 1 during raining and under conditions of pollution. Of course, the flanges 7 also increase the mechanical resistance of the envelope to internal pressures. The flanges 7 are further formed with angles 8 and 9 allowing easy withdrawal of the external mold after molding of the envelope 1.

As shown in FIG. 1, the electrode 3 comprises a principal portion inside the enclosure and centered on the vertical, geometrical axis 10 of the latter. The electrode 3 further comprises an extension integral with the inside, principal portion thereof, traversing radially the envelope 1, and projecting outside this envelope. The length of the electrode extension outside the envelope 1 is sufficient to carry out an outside, electric connection and to attract and receive the electric arc transferred from the inside to the outside of the enclosure, as will be described hereinafter.

FIGS. 2 to 5 represent a surge arrester using the enclosure hereinabove described with reference to FIG. 1 of the drawings.

Figure 2:
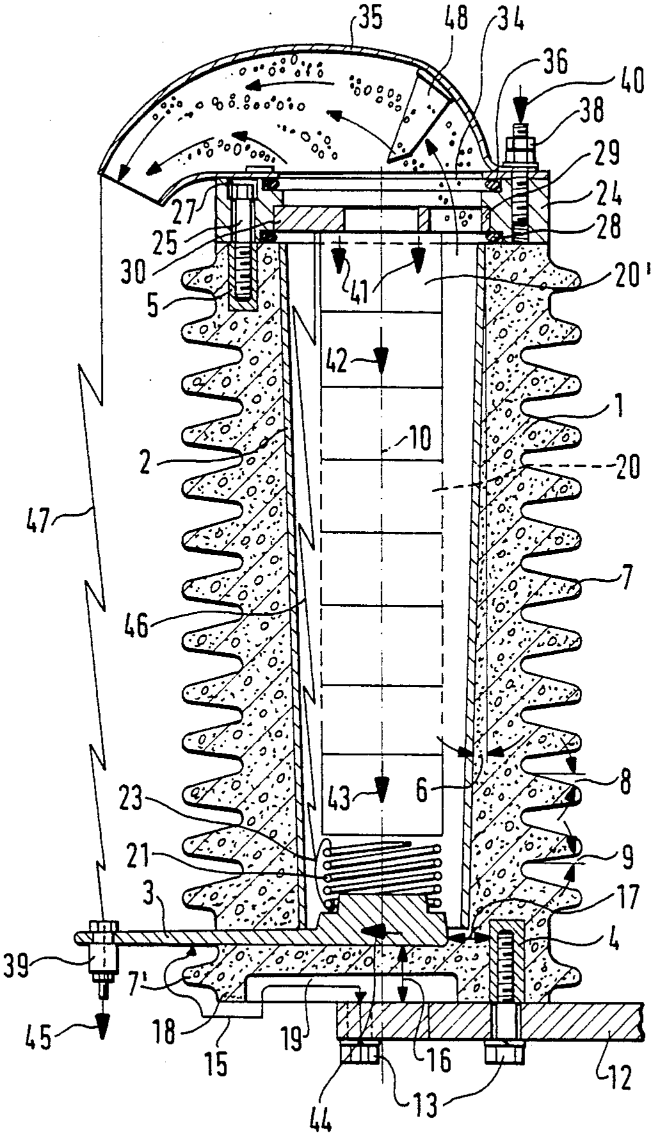
FIG. 2 is a vertical, cross-sectional view of a surge arrester comprising the cylindrical enclosure of FIG. 1.
Figure 3:
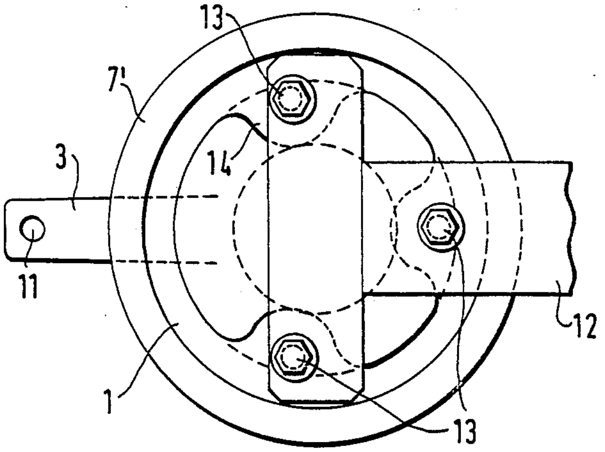
FIG. 3 is a bottom view of the surge arrester of FIG. 2.

As illustrated in FIGS. 2 and 3, the envelope 1 is mounted on a mechanical support 12 by means of three bolts 13 screwed in the three anchors 4. FIG. 3 shows the exact position of the three anchors 4 and of the associated bolts 13. Protuberances such as 14 are formed around each of the anchors 4 in order to increase the solidity in the attachment of the anchors 4 to the insulating material constituting the envelope 1.

The external profile of the portion of the envelope 1 lower than the electrode 3 is so designed as to ensure adequate dielectric insulation by the envelope between the electrode 3 and the electrically conducting pieces associated to the mechanical support 12 over the distances 15, 16 and 17, while minimizing the volume of insulating material required in the manufacture of the envelope 1 so as to reduce both the mass and cost of the surge arrester. For this purpose, the external profile of the portion of the envelope 1 lower than the electrode 3 comprises the lower flange 7', an annular edge 18 and a cavity 19 identified in FIG. 2 of the drawings.

The surge arrester further comprises a pile of disk-like varistors such as 20. The pile of varistors is centered on the geometrical axis 10, and is retained in place by means of an helical spring 21 appropriately mounted between the inside, principal portion of the electrode 3 and the pile of varistors 20, and by means of the upper closure device of the surge arrester.

The principal, inside portion of the electrode 3 is formed with a top end of reduced horizontal cross section to hold the spring 21 in place, while a connector 23, mounted in parallel with the spring 21, establishes electric contact between the lower face of the pile of varistors 20 and the electrode 3.

The closure device of the surge arrester, which is a pressure limiting mechanism, firstly comprises an electrically conducting annular cover 24 fixedly attached to the envelope 1 through three bolts 25 screwed in the three anchors 5. The-three holes 26 bored through the cover 24 to allow attachment thereof to the envelope 1 by means of the anchors 5 and bolts 25 are each formed with an upper, cylindrical cavity of increased diameter such as 27. After screwing of the bolts 25 in the anchors 5, the head of the three bolts 25 are confined in the respective cavities 27, that is under the upper surface of the cover 24 so as to cause no interference in the mounting of the other elements of the pressure limiting mechanism described hereinafter.

Figure 4:
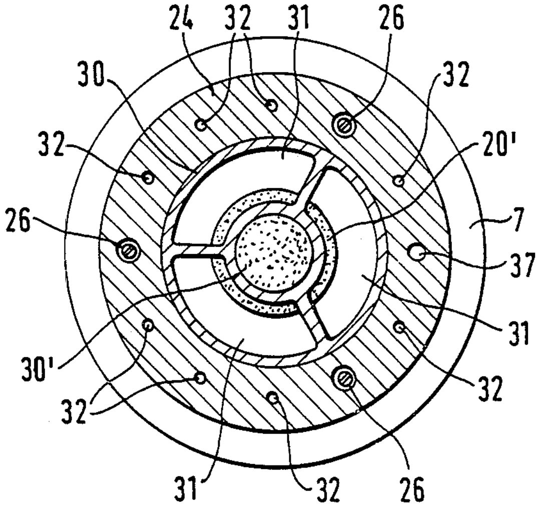
FIG. 4 is an horizontal, cross-sectional view of a closure device of the surge arrester of FIG. 2.
Figure 5:
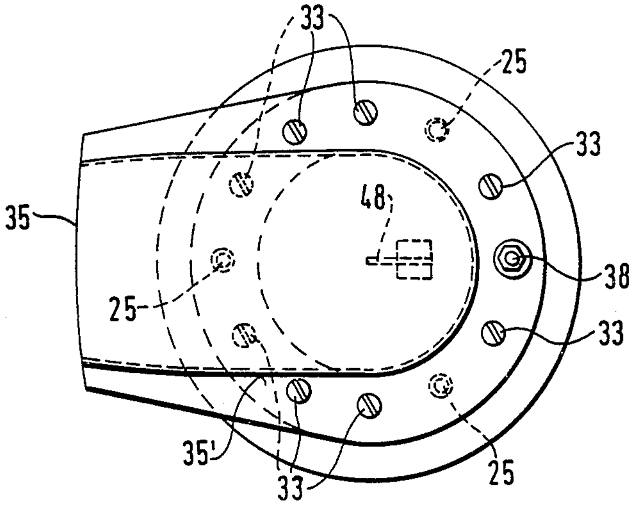
FIG. 5 is a plan view of the surge arrester of FIG. 2.

As can be seen, FIGS. 4 and 5 clearly show the position of the three holes 26, of the three bolts 25, and consequently of the three anchors 5. More specifically, the anchors 5 are separated from one another by an angle of 120° centered on the vertical, geometrical axis 10.

An annular, rubber gasket 28, (see FIG. 2) ensures humidity tightness between the cover 24 and the envelope 1.

The cover 24 defines an annular corner 29 in which is positioned a piece 30 centering and holding the pile of varistors 20. The upper disk-like varistor 20' rests against the piece 30 whereby the pile of varistors 20 is maintained in position, i.e. centered on the axis 10, due to the compression force applied to this pile by the helical spring 21.

As illustrated in FIG. 4, the centering and holding piece 30 comprises a central opening 30'. It also defines three peripheral passages 31 through which the gases are exhausted upon occurrence of a high pressure within the enclosure for surge arrester.

FIG. 4 shows a plurality of threaded holes 32 bored through the cover 24. These holes 32 receive screws (FIG. 5) by means of which a diaphragm 34 and a nozzle are fixed on the top of the surge arrester. As will be seen, the hot gases from the inside of the enclosure are evacuated through the nozzle 35.

The diaphragm 34 is usually made of a thin sheet of plastic or aluminum material, and is mounted between the lower circular contour 35' of the nozzle 35, and the cover 24.

An annular gasket 36, made of rubber or of another elastic material (FIG. 2) ensures humidity tightness between the diaphragm 34 and the cover 24.

As illustrated in FIGS. 2, 4 and 5, the upper electric terminal 38 of the surge arrester is mounted in a threaded, cylindrical hole 37 bored in the cover 24.

The length of the extension of the electrode 3 (FIG. 2) outside of the envelope 1 is sufficient to carry out an electrical connection with the external circuit through an explosive bolt 39 mounted in a hole 11 (see FIGS. 1 and 3) bored through the free, outside end of the extension of the electrode 3. The extension of the electrode 3 outside the envelope 1 must also be long enough to attract and receive the electric arc transferred from the inside to the outside of the enclosure of the surge arrester.

Under normal conditions, the current from the external circuit to which the surge arrester is electrically connected is supplied through the upper terminal 38 (arrow 40 of FIG. 2). It then traverses both the cover 24 to which is connected the terminal 38, and the piece 30, and is transmitted to the pile of varistors 20 (see arrows 41, 42 and 43). Thereafter, it leaves the pile of varistors 20 and is transmitted to the electrode 3 through the connector 23 (see arrow 44). Finally, the current is supplied to the external circuit connected to the electrode 3 through the bolt 39 (see arrow 45).

Upon occurrence of a fault in the varistors 20 of the pile disposed within the envelope 1, an internal, electric arc 46 is produced and creates a high pressure. This pressure perforates the diaphragm 34 and the hot gases are evacuated through the passages 31 and the nozzle 35 towards the outside extension of the integrated electrode 3 thereby creating an electric arc 47 between the nozzle 35 made of electrically conducting material and the outside extension of the electrode 3. The arc is therefore transferred from the inside toward the outside of the enclosure of the surge arrester. Such an arc transfer liberates the inside of the envelope 1 from pressures and temperatures capable of causing explosion of the envelope.

A blade 48 made of steel can also be mounted within the nozzle 35 in order to facilitate perforation of the diaphragm 34 upon production of a high pressure within the enclosure of the surge arrester. More specifically, the blade 48 cuts the diaphragm 34 upon deformation thereof due to a high, internal pressure.

Although the inner wall 2 can be made of numerous materials, such a wall made of frosted glass provides both for humidity tightness of the envelope 1 and for protection of this envelope against breaking thereof by thermal shock caused by contact of the internal, electric arc 46. Indeed, upon production of the arc 46, the frosted glass is contacted by this arc and breaks to thereby prevent breaking of the envelope 1 and explosion of the latter caused by the envelope break.

The external circuit connected to the explosive bolt 39 is separated from the electrode following production of the electric arc and transfer thereof from the inside towards the outside of the enclosure. Indeed, an explosive bolt such as 39 contains a charge of powder whose explosion is caused by a too high electric current (current flowing in the electric arc 46 or 47). The explosion of the bolt 39 creates between the external, electric circuit and the electrode 3 a distance adequate to isolate the surge arrester from the ground when the fault current is interrupted by the breaker installed in the electric supply network for this purpose. As the internal, electric arc 46 usually creates a permanent, electrically conducting path interconnecting the piece 30 with the electrode 3, the normal voltage of the network is applied to the electrode 3 when the external circuit is subsequently resupplied upon normal reclosure of the breaker. The envelope 1 of the surge arrester must therefore adequately insulate the electrode 3 under voltage from the electrically conducting pieces associated to the metallic, mechanical support 12 which in many cases is grounded. For that reason, the insulation by the envelope 1 over the distances 15, 16 and 17 of FIG. 2 must, as already mentioned in the foregoing description, be optimized in order to hold adequate dielectric insulation between the electrode 3 and the electrically conducting pieces associated with the support 12.

The major advantages of the enclosure according to the invention can be summarized as follows:

cost savings due to the use of electrically insulating materials other than porcelain in the manufacture of the envelope 1;

the insulating material constituting the envelope 1 permits the use, without additional complexity, of low cost, bolt anchors which provide for better humidity tightness of the cover 24 as an adequate pressure can be applied on the gasket 28, which withstand the mechanical tension required by the pressure limiting mechanism mounted on the upper end of the surge arrester, and which fix the surge arrester on a mechanical support located at the lower end of the arrester and therefore advantageously remote from the metallic pieces under voltage, (this is enabled by the high mechanical resistance of the material constituting the envelope 1 to which the bolt anchors are fixedly attached);

the pressure limiting mechanism is easily mounted on the envelope 1 by means of the bolt anchors 5, thereby simplifying the system of attachment of such a mechanism to the envelope compared with the conventional attachment systems adapted to porcelain, whereby a surge arrester can be provided at low cost with a pressure limiting mechanism making it non-explosive;

the electrode 3 constitutes an electric terminal integrated to the insulating envelope 1, thereby reducing the number of mechanical and electrical connecting pieces, the cumbersomeness created by the conventional connection pieces, as well as the assembling costs; and the possibility of molding the insulating material constituting the envelope on an inner wall made of frosted glass or of another adequate material which ensures a perfect humidity tightness of the enclosure, and forms a screen protecting the envelope against breaking thereof by thermal shock to which the porcelain and certain other insulating materials are sensitive when directly contacted by an internal, short-circuit electric arc.

Using enclosures according to the invention, non explosive, surge arresters to be installed in distribution networks and completely proof against envelope breaking by thermal shocks have been manufactured, at a cost lower than that of the conventional distribution network surge arresters which are, as mentioned hereinabove, susceptible of explosion.

Although the present invention has been described hereinabove by means of a preferred embodiment thereof, it should be noted that any modification to this preferred embodiment and other utilization of the latter can be carried out, within the scope of the appended claims, without changing or altering the nature and scope of the present invention.

What is claimed is:

1. An enclosure for surge arresters, comprising:
an outer envelope;
a hollow self supporting inner wall made of an electrically non conducting material impervious to humidity and protecting said outer envelop against breaking thereof by thermal shock caused by heat produced within the enclosure; and
anchor means for fixing the enclosure on a mechanical support;
said envelope being made of an insulating material having high mechanical tensile strength;
said envelope being molded on said inner wall so that said inner wall is integrated to said envelope;
said envelope being molded around said anchor means so that said anchor means are embedded within said outer envelope and thereby fixedly attached to said insulating material.

2. An enclosure according to claim 1, wherein said outer envelope is cylindrical.

3. An enclosure according to claim 2, wherein said cylindrical envelope comprises an inner surface which is frusto-conical.

4. An enclosure according to claim 1, wherein said anchor means comprise a plurality of bolt anchors.

5. An enclosure according to claim 1 further comprising an opening and additional anchor means for mounting on the enclosure a device for closing said opening, said insulating material being molded around said additional anchor means so that said additional anchor means are embedded within the insulating material constituting the outer envelope.

6. An enclosure according to claim 5, wherein said additional anchor means comprise a plurality of bolt anchors.

7. An enclosure according to claim 1, further comprising an electrode having a principal portion inside the enclosure, and an extension attached to said inside, principal portion, traversing said outer envelope, and projecting outside the enclosure, said outer envelope being molded around the electrode whereby said electrode is integrated to the outer envelope.

8. An enclosure according to claim 1, wherein the material constituting the outer envelope comprises a synthetic insulating material.

9. An enclosure according to claim 8, in which said synthetic insulating material comprises epoxy-concrete.

10. An enclosure according to claim 8, wherein said synthetic insulating material comprises polymeric concrete.

11. A cylindrical enclosure for surge arrester, comprising:
an outer, cylindrical envelope having a first, closed end and a second, open end;
an inner wall made of an electrically non-conducting material impervious to humidity and protecting said cylindrical envelope against breaking thereof by thermal shock caused by the production of an electric arc within the enclosure;
an electrode located at the closed end of the cylindrical envelope and comprising a principal portion inside said enclosure and an extension attached to said inside, principal portion, traversing the outer envelope, and projecting outside the enclosure;

first anchor means mounted on the closed end of the outer envelope for fixing the enclosure to a mechanical support; and second anchor means mounted on the open end of the cylindrical envelope for fixing a closure device of the said enclosure;

said envelope being made of an insulating material capable of withstanding a high mechanical tension, and being molded on the inner wall and around the electrode and the first and second anchor means, whereby said inner wall and said electrode are integrated to the cylindrical envelope, and the first and second anchor means are fixedly attached to the insulating material consituting the outer envelope.

12. A cylindrical enclosure according to claim 11, wherein the first and second anchor means comprise bolt anchors.

13. A cylindrical enclosure according to claim 11, wherein the closed end of the cylindrical envelope comprises an external cavity and at least one annular, external flange surrounding said envelope for adequately and electrically insulating said electrode from said mechanical support, the cylindrical envelope having a geometrical axis and said annular flange being located in a plane perpendicular to said geometrical axis.

14. A cylindrical enclosure according to claim 11, wherein said envelope has a geometrical axis and comprises a plurality of external, annular flanges each located in a plane perpendicular to said geometrical axis.

15. A cylindrical enclosure according to claim 11, wherein the cylindrical envelope defines a frusto-conical inner surface having a diameter which increases from the closed end towards the open end of the envelope, said inner wall being also frusto-conical.

16. A cylindrical enclosure according to claim 11, wherein the electrically non conducting material constituting said inner wall comprises frosted glass.

17. A cylindrical enclosure according to claim 11, wherein the insulating material constituting the outer envelope comprises a synthetic insulating material.

18. A cylindrical enclosure according to claim 17, wherein said synthetic insulating material comprises epoxy-concrete.

19. A cylindrical enclosure according to claim 17, wherein said synthetic insulating material comprises polymeric concrete.

20. A cylindrical enclosure according to claim 11, wherein the extension of said electrode radially traverses the cylindrical envelope.

21. A cylindrical enclosure according to claim 11, wherein said closure device of the enclosure comprises pressure limiting means.

22. A method of protecting electrical devices from damage due to voltage surges, comprising:

molding an outer envelope around a hollow inner wall and an anchor means thereby forming an enclosure; said hollow inner wall being formed of an electrically non-conducting material impervious to humidity and protecting said outer envelope against breaking thereof by thermal shock caused by heat produced within the enclosure; said outer envelope comprising an insulating material having high mechanical tensile strength;

locating surge arrester components in said enclosure;

fixing said anchor means to a mechanical support;

connecting said enclosure in parallel with an electrical device to be protected having a pair of terminals;

whereby a closed circuit is created in said enclosure parallel to said electrical device to be protected when an over-voltage appears between the terminals of said electrical device.

23. The method according to claim 22 further comprising forming said outer envelope into a cylindrical shape.

24. The method according to claim 33 further comprising defining a frusto-conical inner surface of said cylindrical envelope.

25. The method according to claim 22 further comprising:

forming an opening in said enclosure;

embedding an additional anchor means within said outer envelope;

mounting a closure device for closing said opening on said additional anchor means.

26. The method according to claim 25 further comprising integrating an electrode to said outer envelope; said electrode having a principal portion inside the enclosure, and an extension attached to said inside principal portion, traversing said outer envelope, and projecting outside the enclosure.

27. The method according to claim 22, including forming the outer envelope with a synthetic insulating material.

28. The method according to claim 27, including forming said synthetic insulating material with epoxy-concrete.

29. The method according to claim 27, including forming said synthetic insulating material with polymeric concrete.

30. A method of protecting electrical devices from damage due to voltage surges, comprising:

molding an outer cylindrical envelope having a first, closed end and a second, open end around an inner wall and a first anchor means thereby forming an enclosure; said inner wall comprising an electrically non-conducting material impervious to humidity and protecting said outer envelope against breaking thereof by thermal shock caused by heat produced within the enclosure; said outer envelope comprising an insulating material having a high mechanical tensile strength;

locating surge arrester components in said enclosure;

integrating an electrode to the closed end of the cylindrical envelope, said electrode having a principal portion inside the enclosure, and an extension attached to said inside, principal portion, traversing the outer envelope, and projecting outside the enclosure;

fixing said anchor means to a mechanical support;

embedding a second anchor means in said insulating material at the open end of said cylindrical envelope;

mounting a closure device on said second anchor means;

connecting said enclosure in parallel with an electrical device to be protected having a pair of terminals;

whereby a closed circuit is created in said enclosure parallel to said electrical device to be protected when an over voltage appears between the terminals of said electrical device.

31. The method according to claim 30 further comprising forming a plurality of external, annular flanges on said cylindrical envelope, said flanges each being located in a plane perpendicular to a geometrical axis of said cylindrical envelope.

32. The method according to claim 30 further comprising defining a frusto-conical inner surface of said cylindrical envelope, said surface having a diameter which increases from the closed end towards the open end of the envelope.

33. The method according to claim 30 including forming said electrically nonconducting material constituting said inner wall with frosted glass.

34. The method according to claim 30 including forming the material constituting the outer envelope with a synthetic insulating material.

35. The method according to claim 34 including forming said synthetic insulating material with epoxy-concrete.

36. The method according to claim 34 including forming said synthetic insulating material with polymeric concrete.

* * * * *